United States Patent
Han et al.

(10) Patent No.: US 8,315,637 B2
(45) Date of Patent: Nov. 20, 2012

(54) SIGNAL TRANSMISSION METHOD FOR A TERMINAL USING FRACTIONAL FREQUENCY REUSE SCHEME

(75) Inventors: Jong Young Han, Anyang-si (KR); Han Gyu Cho, Anyang-si (KR)

(73) Assignee: LG Electronics Inc., Seoul (KR)

(*) Notice: Subject to any disclaimer, the term of this patent is extended or adjusted under 35 U.S.C. 154(b) by 49 days.

(21) Appl. No.: 12/996,005

(22) PCT Filed: Jul. 8, 2009

(86) PCT No.: PCT/KR2009/003727
§ 371 (c)(1),
(2), (4) Date: Dec. 2, 2010

(87) PCT Pub. No.: WO2010/005232
PCT Pub. Date: Jan. 14, 2010

(65) Prior Publication Data
US 2011/0143800 A1 Jun. 16, 2011

Related U.S. Application Data

(60) Provisional application No. 61/078,783, filed on Jul. 8, 2008, provisional application No. 61/078,785, filed on Jul. 8, 2008, provisional application No. 61/078,784, filed on Jul. 8, 2008.

(51) Int. Cl.
*H04W 40/00* (2009.01)
(52) U.S. Cl. ............ 455/447; 455/432.1; 455/436; 455/448; 455/450; 455/451
(58) Field of Classification Search ............... 455/432.1, 455/434–435.1, 440–453, 8–13.3, 509, 522, 455/61–67.13; 370/317–334, 341; 375/295–308
See application file for complete search history.

(56) References Cited

U.S. PATENT DOCUMENTS

| | | | | |
|---|---|---|---|---|
| 5,784,406 A | * | 7/1998 | DeJaco et al. | 375/224 |
| 2010/0120464 A1 | * | 5/2010 | Bjorken et al. | 455/522 |
| 2011/0128871 A1 | * | 6/2011 | Yuan et al. | 370/252 |

FOREIGN PATENT DOCUMENTS

| | | |
|---|---|---|
| KR | 1020060008189 | 1/2006 |
| KR | 1020080047021 | 5/2008 |
| KR | 1020080064122 | 7/2008 |
| WO | 2008/055132 | 5/2008 |

* cited by examiner

*Primary Examiner* — Dai A Phuong
(74) *Attorney, Agent, or Firm* — Lee, Hong, Degerman, Kang & Waimey

(57) ABSTRACT

A method for transmitting a signal from a mobile station of a multi-cell environment comprises being allocated with a specific frequency partition from a base station depending on a fractional frequency reuse scheme; receiving modulation and coding scheme (MCS) level information on the specific frequency partition or a specific resource region within the specific frequency partition from the base station; controlling transmit power corresponding to the MCS level depending on a location of the mobile station within a cell, if the specific frequency partition is a frequency partition shared with a mobile station located at an edge region of a neighboring cell; and transmitting a signal to the base station at the controlled transmit power.

11 Claims, 3 Drawing Sheets

Fig. 3
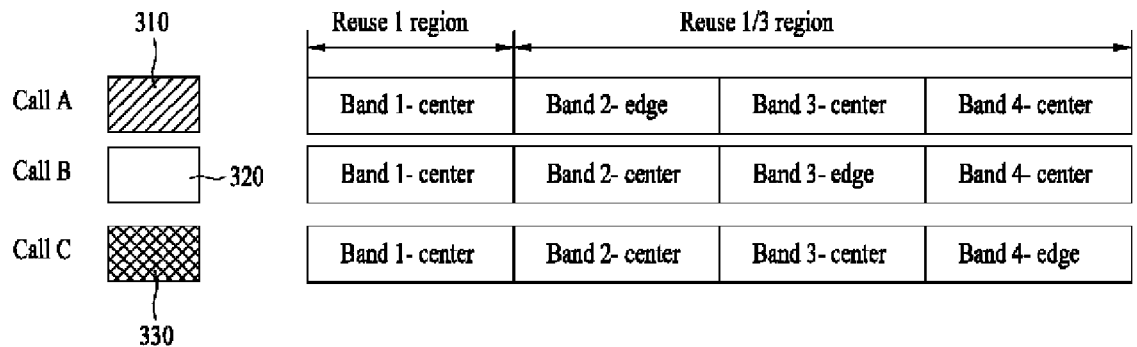
Fig. 4
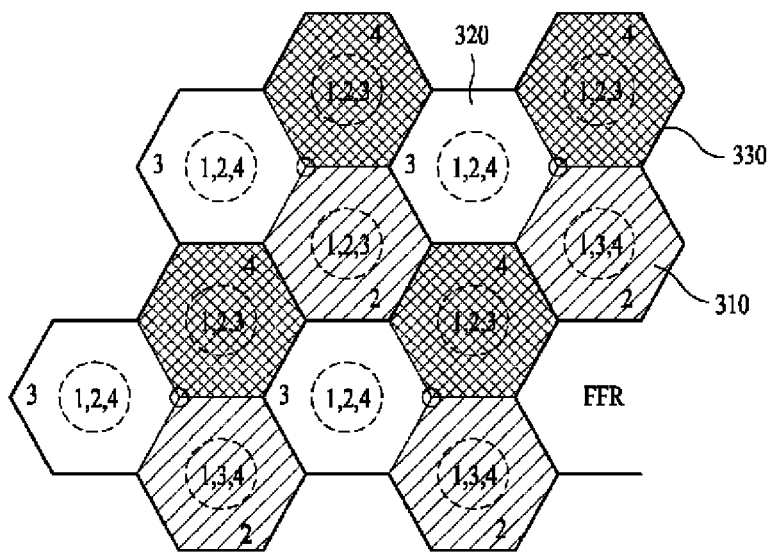
Fig. 5

SIGNAL TRANSMISSION METHOD FOR A TERMINAL USING FRACTIONAL FREQUENCY REUSE SCHEME

CROSS-REFERENCE TO RELATED APPLICATIONS

This application is a 371 U.S. national stage application of International Application No. PCT/KR2009/003727, filed on Jul. 8, 2009, which claims priority to U.S. Provisional Application Ser. Nos. 61/078,783, filed on Jul. 8, 2008, 61/078,784, filed on Jul. 8, 2008, and 61/078,785, filed on Jul. 8, 2008, the contents of which are incorporated by reference herein in their entirety.

TECHNICAL FIELD

The present invention relates to a mobile station and a method for transmitting a signal from the mobile station, and more particularly, to a mobile station under a multi-cell environment, which uses a fractional frequency reuse scheme and a method for transmitting a signal from the mobile station.

BACKGROUND ART

Frequency reuse is one of methods for increasing channels per unit area in a cellular system. The intensity of an electric wave becomes weak gradually as the distance becomes long. Accordingly, since there is little interference between electric waves in a place away from a given distance, a single frequency channel can be used therein. In this way, one frequency can be used simultaneously in various zones. This could increase subscriber capacity. Such efficient use of the frequency will be referred to as frequency reuse. A unit for dividing zones from one another will be referred to as a cell (mobile communication cell), and frequency channel conversion between cells for maintaining communication will be referred to as handoff. In an analog cellular mobile communication system, the frequency reuse technique is necessarily required. A frequency reuse rate is one of parameters representing frequency efficiency in a cellular system. The frequency reuse rate is a value obtained by dividing the number of cells (sectors) which simultaneously use the same frequency in a multi-cell structure by a total number of cells (sectors) of the multi-cell structure.

A frequency reuse rate of a 1 G system (for example, AMPS) is smaller than 1. For example, for 7-cell frequency reuse, a frequency reuse rate is 1/7. A frequency reuse rate of a 2 G system (for example, CDMA and TDMA) has been more improved than that of the 1 G system. For example, in a GSM where FDMA and TDMA are used in combination, a frequency reuse rate reaches 1/4 to 1/3. In case of a 2 G CDMA system and a 3 G WCDMA system, since a frequency reuse rate can reach 1, spectral efficiency is increased and the network arrangement cost is reduced.

When all sectors within one cell and all cells within one network use the same frequency, a frequency reuse rate of 1 can be obtained. However, obtaining a frequency reuse rate of 1 in a cellular network means that edge users of cells have signal receiving throughput reduced by interference from neighboring cells.

In an OFDMA system, since a channel is divided in a sub-channel unit, signal transmission is performed on the sub-channel and all channels are not used unlike the 3 G (CDMA 2000 or WCDMA) system. Using this feature, throughput of cell center users and throughput of cell edge users can be improved at the same time. In this case, the edge region of the cell and the center region of the cell are not defined absolutely. Generally, since the center region of the cell is close to a base station, it means a region where users relatively safe against co-channel interference from neighboring cells are located. Accordingly, inner users located at the center of the cell can use all possible sub-channels. On the other hand, the edge region of the cell is a region where users relatively susceptible to inter-cell interference are located. The users at the edge of the cell use a frequency reuse factor (FRF) not 1, and do not use same frequency partition. Accordingly, at the edge of neighboring cells, a frequency is allocated in such a manner that respective cells use different sub-channels. This frequency allocation is called fractional frequency reuse (FFR).

DISCLOSURE OF THE INVENTION

Technical Problem

Generally, in an OFDMA, since a channel is divided in a sub-channel unit, a signal is transmitted on the sub-channel. In this case, inner users at the center of the cell under the multi-cell environment use all possible sub-channels. Users located at the edge of neighboring cells use an FER scheme where a frequency is allocated in such a manner that respective cells use different sub-channels.

However, under the multi-cell environment that uses FER, inter-user interference occurs within the cell, whereby communication quality or a receiving rate is varied depending on the cell region. In this respect, control information and/or control method for efficient use of FER should be shared between base stations and/or mobile stations.

Accordingly, the present invention is directed to a method for using FFR effectively in a wireless communication system under multi-cell environment.

Technical Solution

To achieve these objects and other advantages and in accordance with the purpose of the invention, as embodied and broadly described herein, in one aspect of the present invention, a method for transmitting a signal from a mobile station of a multi-cell environment comprises being allocated with a specific frequency partition from a base station depending on a fractional frequency reuse scheme; receiving modulation and coding scheme (MCS) level information on the specific frequency partition or a specific resource region within the specific frequency partition from the base station; controlling transmit power corresponding to the MCS level depending on a location of the mobile station within a cell, if the specific frequency partition is a frequency partition shared with a mobile station located at an edge region of a neighboring cell; and transmitting a signal to the base station at the controlled transmit power.

Preferably, if the mobile station is located at the edge of the cell and the MCS level is greater than a predefined reference value, the step of transmitting may transmit the signal by using transmit power higher than the transmit power corresponding to the MCS level. Also, if the mobile station is located at the edge of the cell and the MCS level is less than a predefined reference value, the step of transmitting may transmit the signal by using full transmit power that can be used by the mobile station.

In the mean time, if the mobile station is located at the edge of the cell and the MCS level is greater than a predefined reference value, the step of transmitting may transmit the signal by using transmit power lower than the transmit power corresponding to the MCS level. Also, if the mobile station is located at the edge of the cell and the MCS level is less than a predefined reference value, the transmit power may be controlled considering interference and path loss.

If the mobile station is located at the center of the cell and has a geometry information value greater than a predefined reference value, the step of transmitting may transmit the signal by using transmit power higher than the transmit power corresponding to the MCS level. Also, if the mobile station is located at the center of the cell and has a geometry information value less than a predefined reference value, the step of transmitting may transmit the signal by using transmit power lower than the transmit power corresponding to the MCS level.

In this case, the frequency partition shared with the mobile station located at the edge of the neighboring cell includes at least one of a frequency partition having a frequency reuse rate of 1 and a frequency partition having a frequency reuse rate of 1/n (n is an integer), used by one or more mobile stations located at the edge of the neighboring cell.

In another aspect of the present invention, a mobile station operating under a multi-cell environment comprises a receiving module receiving information indicating a specific frequency partition allocated to the mobile station and modulation and coding scheme (MCS) level information on the specific frequency partition from a base station depending on a fractional frequency reuse scheme; a processor controlling transmit power corresponding to the MCS level depending on a location of the mobile station within a cell, if the specific frequency partition is a frequency partition shared with a mobile station located at an edge region of a neighboring cell; and a transmitting module transmitting a signal to the base station at the controlled transmit power.

Preferably, the mobile station may further comprise a memory storing at least one of modulation and coding scheme information corresponding to each MCS level information, first reference value information on the MCS level, and second reference value information on geometry information.

In this case, the processor, if the mobile station is located at the edge of the cell and the MCS level is greater than the first reference value stored in the memory, may control the transmitting module to transmit the signal by using transmit power higher than the transmit power corresponding to the MCS level, and the processor, if the mobile station is located at the edge of the cell and the MCS level is less than the first reference value stored in the memory, may control the transmitting module to transmit the signal by using full transmit power that can be used by the mobile station.

Also, the processor, if the mobile station is located at the edge of the cell and the MCS level is greater than the first reference value stored in the memory, may control the transmitting module to transmit the signal by using transmit power lower than the transmit power corresponding to the MCS level, and the processor, if the mobile station is located at the edge of the cell and the MCS level is less than the first reference value stored in the memory, may control the transmit power considering interference and path loss.

Also, the processor, if the mobile station is located at the center of the cell and has a geometry information value greater than a predefined reference value, may control the transmitting module to transmit the signal by using transmit power higher than the transmit power corresponding to the MCS level, and the processor, if the mobile station is located at the center of the cell and has a geometry information value less than a predefined reference value, may control the transmitting module to transmit the signal by using transmit power lower than the transmit power corresponding to the MCS level.

Advantageous Effects

According to the present invention, the following advantages can be obtained.

First of all, if FFR is used for signal transmission, inter-user interference within the cell can be reduced, whereby efficiency in signal transmission and reception can be improved.

In addition, since the mobile station controls the power used for signal transmission using an uplink to the base station in accordance with a predefined condition, its battery use can be reduced. Since inter-cell interference can be reduced, battery consumption of another mobile station may be reduced.

It is to be understood that both the foregoing general description and the following detailed description of the present invention are exemplary and explanatory and are intended to provide further explanation of the invention as claimed.

BRIEF DESCRIPTION OF THE DRAWINGS

FIG. 3 is a diagram illustrating a method for allocating a band to each cell by using FFR in accordance with one embodiment of the present invention;

FIG. 4 is a diagram illustrating an example of a structure of a cell where frequency partition is allocated in accordance with the FFR of FIG. 2 under a multi-cell environment;

FIG. 5 is a diagram illustrating an example of a structure of a cell where frequency partition is allocated without FFR in accordance with one embodiment of the present invention;

BEST MODE FOR CARRYING OUT THE INVENTION

Figure 1:
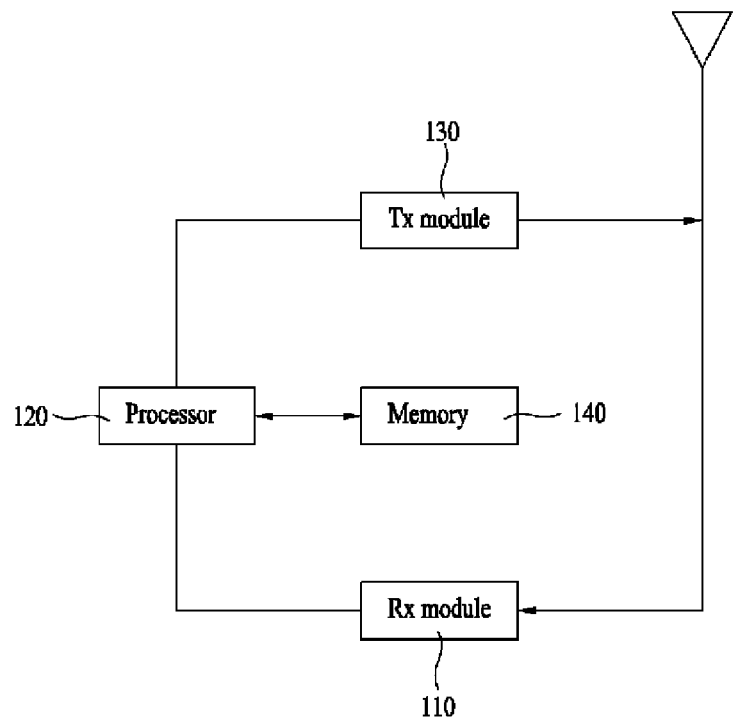
FIG. 1 is a block diagram illustrating an example of a mobile station that transmits a signal by using FFR in accordance with one embodiment of the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, although the following description will be made based on some terminologies, the following description will not be limited to such terminologies and other terminologies may be designated as same meaning. Also, wherever possible, the same reference numbers will be used throughout the drawings and the specification to refer to the same or like parts.

In the specification, unless explicitly described to the contrary, the word "include" and variations such as "includes" or "including" will be understood to imply the inclusion of stated elements but not the exclusion of any other elements.

The technology disclosed hereinafter can be used for various communication systems that can provide various communication services such as voice and packet data. The technology of the communication system can be used in a downlink or an uplink. A base station may be replaced with terms such as a fixed station, Node B, eNode B (eNB), access point, and advanced base station (ABS). Also, the mobile station may be replaced with terms such as a user equipment (UE), a subscriber station (SS), a mobile subscriber station (MSS), an advanced mobile station (AMS), and a mobile terminal (MT).

Furthermore, a transmitting side means a node that transmits data or voice services while a receiving side means a node that receives data or voice services. Accordingly, in an uplink, the mobile station could be a transmitting side while the base station could be a receiving side. Likewise, in a downlink, the mobile station could be a receiving side while the base station could be a transmitting side.

Meanwhile, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments of the present invention can be supported by standard documents disclosed in at least one of wireless access systems, i.e., IEEE (Institute of Electrical and Electronics Engineers) 802 system, 3GPP system, 3GPP LTE (3rd Generation Partnership Project Long Term Evolution) system, and 3GPP2 system. Namely, among the embodiments of the present invention, steps or parts which are not described to clarify the technical features of the present invention can be supported by the above standard documents. Also, all terminologies disclosed herein can be described by the above standard documents. Particularly, the embodiments of the present invention can be supported by one or more of standard documents of IEEE 802.16 system, i.e., P802.16e-2004, P802.16e-2005, P802.16Rev2, and IEEE P802.16m.

Specific terminologies hereinafter used in the following description are provided to assist understanding of the present invention, and various modifications can be made in the specific terminologies within the range that they do not depart from the technical spirits of the present invention.

In general, for application of FFR under the multi-cell environment, respective base stations use different frequency bands on a sub-channel. For example, since some tones are used by all sectors, they have a frequency reuse rate of 1. On the other hand, since the other tones are used by only 1/3 of the sectors, they have a frequency reuse rate of 1/3. In this way, the frequency reuse rate can be set in various manners depending on network configuration.

In the mean time, for efficient FFR, the power of the mobile station can be controlled considering inter-cell interference. Power control capability of the mobile station considering inter-cell interference may generate ICI (inter-carrier interference) between neighboring cells or may be affected by information on susceptible users or mobile stations. For example, like that it is intended to improve capability of a specific user located at a cell edge region or a cell center region, capability of a specific user or a specific user group in the system may be varied depending on intention of inter-cell power control.

Accordingly, it is required that a user, mobile station, frequency range or time range, which is intended for inter-cell power control, is limited to an object that is susceptible to ICI or affects ICI. For exchange of ICI related information between cells or user information or mobile station information, signaling through an air channel or signaling through a backbone network may be considered.

Inter-cell power control can be determined by a base station or a scheduler located at the base station based on path loss, geometric information, signal-to-interference noise ratio (SINR), etc. Hereinafter, a power control method according to one embodiment of the present invention will be described.

Figure 2:
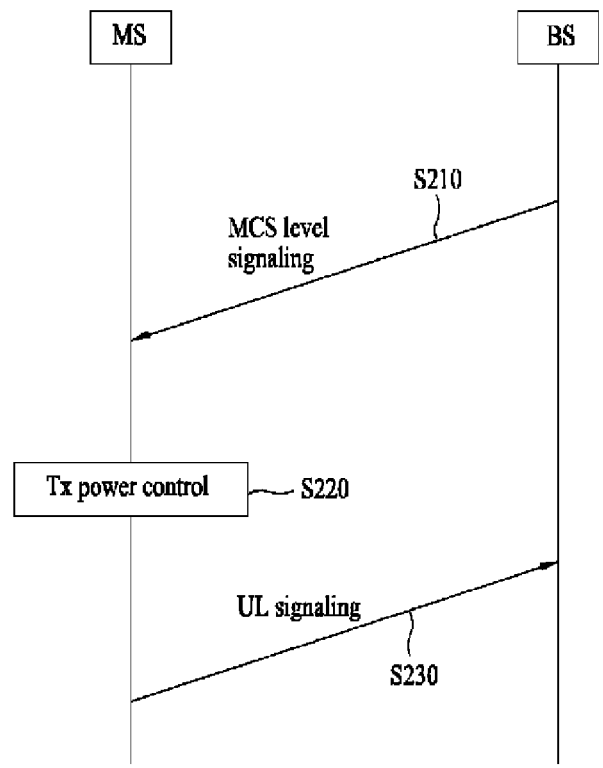
FIG. 2 is a diagram illustrating a flow for signal transmission in accordance with one embodiment of the present invention.

FIG. 1 is a block diagram illustrating an example of a mobile station that transmits a signal by using FFR in accordance with one embodiment of the present invention, and FIG. 2 is a diagram illustrating a flow for signal transmission of the mobile station of FIG. 1 in accordance with one embodiment of the present invention.

In general, a mobile station operating under the multi-cell environment can transmit a signal to a base station through an uplink by using fractional frequency reuse (FFR).

Referring to FIG. 1, the mobile station according to one embodiment of the present invention includes a receiving module (Rx module) 110 for receiving required information from a base station, for example, information indicating specific frequency partition or specific frequency band allocated to the mobile station and modulation and coding scheme (MCS) level information on the specific frequency partition or a specific resource region allocated to the mobile station within the specific frequency partition, a processor 120 controlling transmit power depending on the location of the mobile station within a cell when the specific frequency partition is shared with a mobile station located at the edge of a neighboring cell, and a transmitting module (Tx module) 130 for transmitting a signal to the base station by using the controlled transmit power.

If the mobile station transmits a signal to the base station by using FFR, the base station is affected by interference depending on multi-users within the cell and multi-cell environment conditions, whereby a receiving rate of the signal is deteriorated. Accordingly, referring to FIG. 2, for efficient application of FFR, the base station transmits the information indicating specific frequency partition allocated to the mobile station and the MCS level information to the mobile station (S210). The mobile station determines the transmit power based on the received information (S220), and transmits the signal to the base station by using the determined transmit power (S230). Although the transmit power for efficient FFR may be controlled by the mobile station as illustrated in FIG. 2, the base station may perform power control by receiving the MCS level information and the information indicating specific frequency partition allocated to the mobile station for application of FFR from the mobile station, or may perform a control operation based on information directly measured by itself. In this case, if the base station reports a determined matter in respect of the transmit power to the mobile station, the corresponding mobile station performs signal transmission through an uplink in accordance with the reported matter.

For transmit power control, referring to FIG. 1, the mobile station according to one embodiment of the present invention may further include a memory 140 for storing at least one of modulation and coding scheme information corresponding to MCS level information, first reference value information on the MCS level, and second reference value information on geometry information.

In order to determine the transmit power, the processor 120 derives the MCS level information, the information on geometry or path loss, and reference information on MCS level information or geometry information from the memory 140 and controls the transmit power depending on whether the specific frequency partition allocated to each cell is shared with the mobile station located at the edge of a neighboring cell. In this case, the processor 120 controls the transmit power depending on at least one of the MCS level information on the specific frequency partition and the information on geometry or path loss depending on the location of the mobile station within the cell.

The geometry information means information on the distance between a base station and the mobile station. In more detail, the geometry information could be information on the distance between the mobile station and a base station located within one cell or the distance between the mobile station and a base station located within another cell. The information on path loss or the geometry information may be transmitted from a base station to the mobile station or may be measured by the mobile station. If the information on path loss or the geometry information is measured by the mobile station, the mobile station uses a signal transmitted from a base station through a downlink regardless of time division duplex (TDD)/frequency division duplex (FDD). In this case, examples of a downlink signal used to measure the information include a preamble, a midamble, and a common pilot. Also, since the information on path loss or the geometry information is based on long-term geometry, it may have a single value per mobile station.

Specifically, the power control method performed by the processor to reduce ICI in accordance with one embodiment of the present invention will be described below. If FFR is used on uplink, transmit power is controlled to reduce inter-cell interference, whereby efficiency in use of FFR can be enhanced.

FIG. 3 is a diagram illustrating a method for allocating specific frequency partition to each cell by using FFR in accordance with one embodiment of the present invention.

When a user's mobile station transmits a signal to a base station under the multi-cell environment, users of each cell can be classified into several groups for application of FFR. In this case, the base station divides the users into several groups and allocates the groups to a plurality of frequency partitions. According to one embodiment of the present invention, a mobile station receives information of each user group and information on a specific frequency partition allocated to each group from a base station through the Rx module 110.

In general, for application of FFR using a plurality of frequency partitions, the user groups will be divided and allocated as follows.

The user groups can be classified into a first user group having a reuse rate of 1 which uses one frequency partition at a center region and an edge region of a cell and a user group having a reuse rate of 1/n use. The user group having a reuse rate of 1/n, for example, a user group that uses a frequency partition having a reuse rate of 1/3 can be classified into a second user group which is user(s) located at the center region of the cell and uses the same frequency partition as that allocated to an edge region of a neighboring cell and a third user group which is user(s) located at the edge region of the cell and uses the same frequency partition as that allocated to a center region of a neighboring cell. A cell structure for allocating a frequency partition to each cell will be illustrated in FIG. 4.

As described above, when a plurality of users are grouped in one or more groups and allocated with frequency partition (s), a user located at a center region or an edge region of a cell may give interference effect to a user that uses the same frequency at a neighboring cell.

Accordingly, in the method for transmitting a signal in accordance with one embodiment of the present invention, the transmit power on uplink are controlled depending on whether the user is at the cell edge region or the cell center region, whereby interference effect can be reduced and user capability can be improved. Also, in the transmit power control method according to one embodiment of the present invention, the MCS level of the user can be used.

First of all, as illustrated in FIG. 3, when a user located at a center region of a cell A 310 is allocated with a frequency partition 3, it may give interference effect to a user allocated with the frequency partition 3 of a neighboring cell B 320 and a user allocated with the frequency partition 3 of another neighboring cell C 330.

Accordingly, according to one embodiment of the present invention, in order to reduce inter-cell interference, a processor 120 performs power control in such a manner that a user at a center of a cell that uses the same frequency partition as that of an edge region of a neighboring cell limits its available maximum transmit power to transmit power where the transmit power is based on target SINR corresponding to MCS level lower than the original MCS level used for signal transmission of the mobile station. For example, in the system having a total of seven MCS levels, if target SINR of a cell center user corresponding to a frequency reuse rate of 1/3 in one cell corresponds to an MCS level of 6, the processor 120 adjusts the transmit power to that corresponding to target SINR at an MCS level of 5 lower than the MCS level originally used by the cell center user. As a result, the power used for signal transmission can be reduced and interference effect caused to the neighboring cell can be reduced correspondingly.

Next, transmit power of a user located at an edge region of an arbitrary cell may be limited or enhanced freely.

Referring to FIG. 3, a user that uses a frequency partition 2 at a cell A 310, a frequency partition 3 at a cell B 320 and a frequency partition 4 at a cell C 330 may cause high interference for a frequency partition that can be used by a user at a center region of a neighboring cell. In this case, the transmit power control may be varied depending on a cell region given a priority to improvement of user capability.

First, the case where a priority for improving user capability is given to user(s) at a cell edge region will be described. If an MCS level of a specific frequency partition allocated to a cell edge user is high, the processor 120 sets transmit power being used on uplink by the mobile station to transmit power based on SINR higher than target SINR corresponding to an MCS level required for signal transmission. At this time, according to another example of the present invention, the processor 120 may set the transmit power to a value greater than the transmit power based on the target SINR corresponding to an MCS level originally set for signal transmission. On the other hand, if the MCS level of the cell edge user is set to a predefined level or less like level 3 in a state that a total of seven MCS levels are provided, the processor 120 sets the transmit power being used for signal transmission by the mobile station to full transmit power available by the mobile station, regardless of other condition such as geometry information or path loss. Alternatively, after a minimum value of the transmit power is defined, if a calculated transmit power value is less than the minimum value, the processor may set the transmit power to the minimum transmit power value.

Second, the case where a priority for improving user capability is given to user(s) at a cell center region will be described. If an MCS level of a specific frequency partition allocated to the cell edge user is high, the processor 120 sets transmit power being used for signal transmission of the mobile station to transmit power corresponding to target SINR lower than target SINR corresponding to the MCS level originally set for signal transmission. At this time, according to another example of the present invention, the processor 120 may set the transmit power to a value lower than the transmit power based on the target SINR corresponding to the MCS level originally set for signal transmission. On the other hand, if the MCS level of the cell edge user is equal to or less than a predefined level, for example level 3 in a state that a total of seven MCS levels are provided, the processor 120 performs the original transmit power control method by considering interference or path loss.

Next, the transmit power control according to one embodiment of the present invention may be performed based on geometry information or path loss between a base station and a mobile station for a cell center user that uses the same frequency partition as that of an edge region of a neighboring cell.

In general, ICI is in inverse proportion to the geometry information indicating the distance between a mobile station and a base station. Namely, if high geometry information is provided for a corresponding base station, it means that the distance between the mobile station and its neighboring base station is long. In this case, mutual interference effect between the mobile station and the base station is low, whereby low ICI occurs but path loss is increased. On the other hand, if low geometry information is provided for the corresponding base station, it means that the distance between the mobile station and its neighboring base station is short. In this case, low path loss occurs but high ICI may occur.

Accordingly, as illustrated in FIG. 3, if a frequency partition used by a user of the center region of the cell A 310 is the same as the frequency partition 3 used at an edge region of the neighboring cell B 320 and the frequency partition 3 of the neighboring cell C 330, geometry information of the user located at the center region of the cell A 310 corresponds to the range more than threshold geometry (hereinafter, referred to as 'reference value') of a predefined reference, the transmit power is set in such a manner that the user of the center region uses the transmit power higher than a predefined transmit power. Accordingly, the transmit power based on the geometry information can be set as expressed by the following Equation 1.

$$P'_{tx}=P_{tx}+\alpha \text{ (if, user geometry} \geq \text{threshold geometry)} \quad \text{[Equation 1]}$$

In this case, $P'_{tx}$ represents transmit power on the uplink, and $P_{tx}$ can be varied depending on whether a frequency partition used by the user at the predefined transmit power has a reuse rate of 1, 1/3 or 2/3.

If the user geometry information is greater than the threshold geometry stored in the memory 140, the processor 120 sets the transmit power $P'_{tx}$ to a value higher than the predefined transmit power $P_{tx}$ as high as $\alpha$. In this case, $\alpha$ can be set arbitrarily, taking amount of power that can reduce inter-cell interference into account.

On the other hand, if the user geometry information of the user located at the center region of the cell A 310 is less than the threshold geometry stored in the memory 140, the processor 120 can set the transmit power $P'_{tx}$ to a value lower than the predefined transmit power $P_{tx}$ as expressed by the Equation 2 below.

$$P'_{tx}=P_{tx}-\alpha \text{ (if, user geometry} < \text{threshold geometry)} \quad \text{[Equation 2]}$$

In the mean time, the user that uses the frequency partition corresponding to a reuse rate of 1 can set the transmit power considering ICI with the user at the center region of the neighboring cell that uses the frequency partition corresponding to a reuse rate of 1. Referring to FIG. 3, the cell A 310, the cell B 320, and the cell C commonly use the frequency partition 1 having a reuse rate of 1. In this case, signal receiving throughput at a base station may be deteriorated by mutual interference of the cells. Accordingly, as expressed by the Equation 1 or the Equation 2, the geometry information can be compared with the threshold geometry information to control the transmit power.

Next, the transmit power control between cells according to another embodiment of the present invention may be performed based on MCS level and geometry information or path loss.

Each of the MCS level and the geometry information may have a predefined reference value varied depending on a reuse rate or a user location region within the cell. In other words, the reference value at the region of the reuse rate of 1 is defined differently from that at the region of the reuse rate of 1/N. The reference value is defined depending on whether a user is located at the center region or the edge region even within one cell of a reuse rate of 1/N. The transmit power according to the present invention can be controlled depending on whether the MCS level and the geometry information satisfy the predefined reference value.

First, the case where a user uses the frequency partition of the reuse rate of 1 at a cell center region and a cell edge region will be described. If the user geometry information of the user that uses the frequency partition of the reuse rate of 1 is greater than the reference value, the processor 120 sets the transmit power used at the MCS level higher than a predefined MCS level on uplink. If the user geometry information is less than the reference value, the processor 120 transmits a signal in accordance with the predefined transmit power.

Second, the case where the user uses the frequency partition of the reuse rate of 1/3 not the reuse rate of 1 at the cell center region will be described. Generally, the predefined transmit power is used. If the user geometry information is greater than the first reference value and the MCS level is less than the second reference value, the processor 120 sets the transmit power corresponding to target SINR higher than target SINR of the predefined MCS level. If the user geometry information is less than the first reference value and the MCS level is greater than the second reference value, the processor 120 sets the transmit power corresponding to target SINR lower than target SINR of the predefined MCS level.

Third, the case where the user uses the frequency partition of the reuse rate of 1/3 not the reuse rate of 1 at the cell edge region will be described. Generally, the predefined transmit power is used. If the user geometry information is less than the first reference value and the MCS level is greater than the second reference value, the processor 120 sets the transmit power to full Tx power available by the mobile station.

The transmit power control method for reducing ICI and enhancing receiving throughput when FFR is used on the uplink has been described as above. If the base station sets the transmit power considering the MCS level information and the geometry information, the mobile station can transmit the transmit power by considering the MCS level information and the geometry information. However, if the transmit power controlled by the MCS level in accordance with one embodiment of the present invention is less than predetermined predefined reference value, the mobile station transmits a signal using the transmit power corresponding to the reference value, thereby preventing a transmission rate from being reduced to a predefined level or less. In this way, the transmit power control method according to one embodiment of the present invention can be applied to even the case where the number of frequency partitions is one regardless of a specific region of a cell as well as the case where the FFR scheme for divisionally allocating users to a plurality of specific frequency partitions is used.

In the mean time, the FFR scheme can be used on the downlink as well as the uplink. In order to reduce inter-cell interference, whether the FFR should be performed, the number of bands used for FFR, bandwidths, and a frequency reuse factor for FFR should be determined.

Accordingly, the method for setting FFR in accordance with the second embodiment of the present invention is intended to minimize a control signal and efficiently perform FFR as an information exchange rate between neighboring cells is increased due to various matters determined as above. Hereinafter, the method for setting FFR in accordance with the second embodiment of the present invention will be described with reference to Table 1 below.

Table 1 illustrates an example of a method for setting FFR in accordance with one embodiment of the present invention.

TABLE 1

|  | Reuse rate 1 (no FFR) | Application of FFR | Signaling |
| --- | --- | --- | --- |
| Number of User partition | 1 | 4 | 2 bit signaling |
| Reuse factor | 1 | 1/3, 2/3 | |
| BW partition | $BW_T$ | $BW_T/(3 + x)*[1, 1, 1, x]$ | 2 bit signaling |
| Transmit Power level | $P_1$ | $P_4/(1 + a + 2b)*[a, b, b, 1]$ | Signaling less than 10 bits |

For FFR, Table 1 suggests Number of User partition (or grouping), frequency reuse factor (FRF), BW partition, Transmit power level (in case of downlink), a signaling format for indicating the transmit power level, and bits for the signaling.

In one embodiment of the present invention, the determined matters of FFR are used as shown in Table 1. For example, it is assumed that signaling bits is 2. In this case, if FFR is not used, it may be indicated by 00. If FFR is used, it may be indicated by 01, 10 or 11.

Signaling Format: 00

Figure 6:
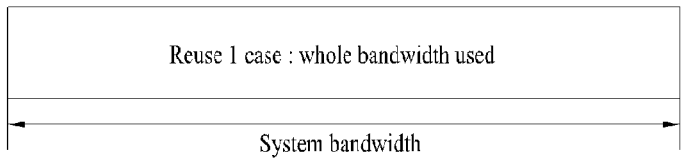
FIG. 6 is a diagram illustrating a frequency full band when FFR is not used like FIG. 5.

Supposing that signaling bits of 2 bits are provided, if the signaling format is 00, it may indicate that FFR is not used. Since the same frequency partition is used at the cell center region and the cell edge region, FRF, Number of user partition may be 1, BW may be a bandwidth $BW_T$ based on system throughput, and the transmit power level for the downlink may be 1. In Table 1, $P_1$ represents a power level 1 (P1 level) and can be determined depending on system throughput. As described above, if FFR is not used, the cell can be configured and frequency partition can be allocated as illustrated in FIG. 5 and FIG. 6.

FIG. 5 is a diagram illustrating an example of a structure of a cell where frequency partition is allocated without FFR in accordance with one embodiment of the present invention. Even though the full frequency band is divided into four frequency partitions, if FFR is not used, all cells transmit a signal is transmitted over a cell by using the four frequency partitions 1, 2, 3, 4 regardless of a center region or an edge region of the cell. In other words, the frequency reuse rate is 1 and the full frequency band could be the system bandwidth as illustrated in FIG. 6. In case of the downlink, the transmit power of the base station corresponds to P1 level and can be used equally for all users.

Hereinafter, the case where FFR is used will be described.

Signaling Format: 01, 10

If 2 bit signaling does not indicate 00, it may indicate that FFR is used. For example, if the full frequency band is divided into four frequency partitions (bands), there may be a frequency partition of FRF=1 that cannot be used by a cell edge user and a frequency partition of FRF=1/3 or FRF=2/3 that can be used by the cell edge user. Signaling bits may be 01 in case of FRF=1/3, while signaling bits may be 10 in case of FRF=2/3, for instance. The signaling bits can be limited considering increase of the control signal and efficiency of FFR or complexity in management of FFR.

Figure 7:
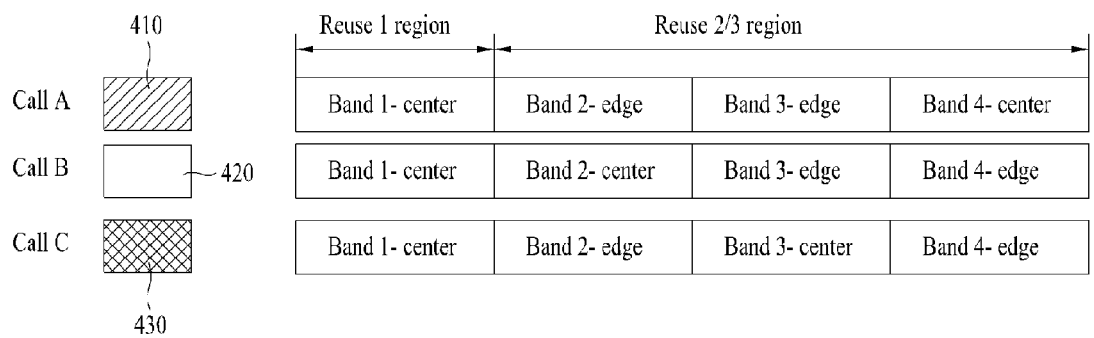
FIG. 7 is a diagram illustrating a method for allocating a band to each cell by using FFR in accordance with another embodiment of the present invention.
Figure 8:
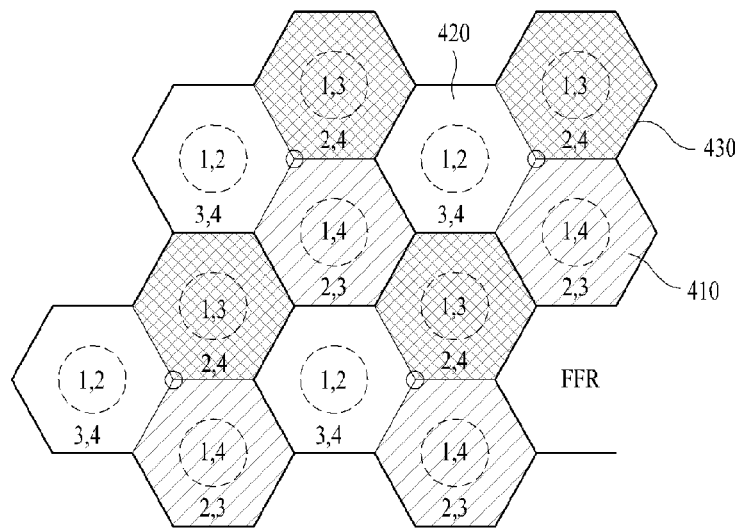
FIG. 8 is a diagram illustrating an example of a structure of a cell where frequency partition is allocated in accordance with the FFR of FIG. 7 under a multi-cell environment.

As described above, FIG. 3 and FIG. 4 illustrate that FFR according to one embodiment of the present invention is used and frequency partition is allocated to each cell in case of FRF=1/3. FIG. 7 and FIG. 8 are diagrams illustrating that frequency partition is allocated to each cell in case of FRF=2/3 when FFR is used in accordance with another embodiment of the present invention.

Referring to the aforementioned Table 1, supposing that BW partition rule is $BW_T/(3+x)*[1,1,1,x]$, frequency partitions 2,3,4 correspond to a reuse rate of 1/3 and may have BW of the same ratio of 1:1:1. However, a ratio of band 1: band (2+3+4) may be varied. In this case, x is frequency partition 1 allocated to the cell region having a reuse rate of 1 in FIG. 4. For indicating the BW partition, signaling bits of 2 bits are used.

In Table 1, if FFR is used, Number of user partition is 4, which represents that users can be divided into four groups in case of FRF=1/3 and FRF=2/3. Three of the four groups are the same as described above. In other words, the first user group of a reuse rate of 1, which uses the same frequency partition, exists at the cell center region and the cell edge region. The users that use the frequency partition having a reuse rate of 1/3 or 2/3 can be divided into a second user group that is located at the cell center region and uses the same frequency partition as that allocated to an edge region of a neighboring cell, a third user group that is located at the cell edge region and uses the same frequency partition as that allocated to a center region of a neighboring cell, and a fourth user group that is located at the cell edge region and uses the same frequency partition as that allocated to an edge region of a neighboring cell. In this case, the fourth user group corresponds to the case where the frequency partition having a reuse rate of 2/3 is used.

In other words, referring to FIG. 3 and FIG. 4, based on the cell A 310, the user that uses the frequency partition 1 corresponds to the first user group, the user that uses the frequency partitions 3 and 4 corresponds to the second user group, and the user that uses the frequency partition 2 corresponds to the third user group. In the mean time, referring to FIG. 7 and FIG. 8 based on the cell A 410, the user that uses the frequency partition 1 corresponds to the first user group in the relation with the neighboring cell B 420 and cell C 430, the user that uses the frequency partition 4 corresponds to the second user group in the relation with the neighboring cell B 420, the user that uses the frequency partition 2 corresponds to the third user group in the relation with the neighboring cell B 420, and the user that uses the frequency partition 3 corresponds to the fourth user group in the relation with the neighboring cell B 420. If the user groups are divided in the relation with the neighboring cell C 430 based on the cell A, the user group corresponding to the user that uses each frequency partition is varied. Namely, the user groups are divided relatively depending on the relation with a neighboring cell.

Next, power control per frequency partition when FFR is used on the downlink will be described.

Signaling Format: 11

When FFR is used on the downlink, power control per band can be performed. At this time, a power level 1 (P1 value) can be set. Separate signaling is required for indicating the power level 1. Also, separate signaling is required even in the case that a bandwidth of a frequency reuse range defined between the respective cells is varied. In this case, separate signaling using 2 bits can be represented by signaling indication such as 11.

As described above, the base station can set efficient FFR based on the several determined matters and transmit a signal to the user by using the set FFR. Alternatively, the base station can allow a plurality of users that transmit and receive to and from the base station to use the set FFR. Geometry information or path loss information required to set the FFR may be acquired by the base station as described above or may be reported from the mobile station.

Hereinafter, the method for acquiring information required for FFR and reporting the acquired information to the base station will be described.

The mobile station measures path loss or geometry information by using a downlink signal to determine configuration of FFR and reports the measured result to the base station. At this time, the mobile station may acquire inter-cell power control information, for example, modulation and coding scheme (MCS) level information together with the path loss or geometry information and then report them to the base station. Generally, the mobile station reports the measured information to the base station at a period not greater than a FFR dynamic period. The FFR dynamic period means that FFR configuration between cells, the number of FFR groups, a bandwidth of each group, and a power level are changed commonly. Also, the mobile station may report the measured information to the base station at a period not shorter than a measured period.

The base station determines whether the FFR should be performed, the number of bands used for FFR, bandwidths, and a frequency reuse factor, based on the information reported from the mobile station, and transmits a signal to the mobile station by using FFR corresponding to the determined option. At this time, in order to reduce inter-cell interference (ICI) and improve user or system throughput, inter-cell power control according to one embodiment of the present invention can be used.

In more detail, an entity which acquires information for inter-cell power control should first be selected. A method for selecting a user or mobile station which will acquire required information may be varied depending on whether the user or the mobile station is selected based on a base station within a serving cell or a base station included in a neighboring cell.

First of all, the case where a mobile station is selected based on a base station located within a serving cell will be described. In this case, a user or mobile station having a value less than or greater than a predefined threshold value can be selected based on path loss, geometry information and received SINR. Alternatively, a user to which inter-cell power control is applied can be selected among a plurality of users depending on the predefined ratio.

Next, the case where a mobile station is selected based on a base station included in a neighboring cell will be described.

In this case, a user or mobile station that causes strong ICI for the base station included in the neighboring cell can be selected to perform inter-cell power control.

First, the user or mobile station may be selected based on information obtained from communication through a backbone network between a base station of a serving cell and a base station of a neighboring cell. For example, the serving base station receives, from the base station of the neighboring cell, information on a resource region affected by strong ICI in the frequency range and can select a user scheduled to use the same resource as the resource region, wherein the frequency range may be varied depending on the system, such as a frequency band based on sub-channel, resource block and sub-channel.

Second, the user or mobile station may be selected based on information acquired through an air channel between a mobile station of an arbitrary cell and a base station of a neighboring cell. The user or mobile station can determine whether it may cause strong interference for the neighboring cell, by using a signal used for handover or a signal used for scanning, or based on the size of a signal (for example, known signal such as preamble or pilot) received from the neighboring cell during cell search, path loss, geometry information and signal transmission latency time, and report the determined result to the serving cell. Also, the user or mobile station may report the acquired information to the serving cell such that the serving cell can determine or select a user that may generate strong ICI.

Third, the user or mobile station can be selected based on information acquired through an air channel between a mobile station and a base station included in a neighboring cell. A user of each cell receives from its neighboring cell a downlink signal which is transmitted for a user of a neighboring cell or transmitted for a user of other cells as well as a user of a serving cell, and measures information or strength of the received signal to determine whether to perform inter-cell power control. In this way, a user which will perform inter-cell power control can be selected.

As described above, an entity for acquiring information is selected, and if the entity acquires the information, the entity should report the acquired information to a base station such that the base station sets FFR. Hereinafter, the method for a mobile station to report the information acquired from the serving cell or the neighboring cell to the base station will be described in more detail.

If a base station of a serving cell determines whether inter-cell power control is performed, a mobile station reports the information acquired from a base station of a neighboring cell or a mobile station of the neighboring cell to the base station of the serving cell.

At this time, the mobile station can report the information to the base station by using the uplink in various methods as follows.

First, the case where the mobile station reports the information to the base station by using an uplink report channel of the legacy system will be described. If the mobile station acquires information for inter-cell power control by using handover, scanning and ranging, for handover request, handover report, and scanning report, it can report the acquired information to the base station of the serving cell by correcting a legacy uplink channel.

Second, the case where the mobile station reports the information on inter-cell interference to the base station by using a new signal and a new report channel will be described. In this case, if a period for inter-cell power control is different from the uplink control channel of the legacy system or if event triggered report is required, the system can use a new report signal format and a new report channel to report the information required for inter-cell power control. A transmission period of the reported information may be a periodic report corresponding to a multiple of N of an inter-cell power control period. Alternatively, the transmission period may be an aperiodic report depending on decision of the base station of the serving cell and the mobile station.

As described above, if the mobile station reports the acquired path loss information and geometry information to the base station for power control, the base station can determine FFR, which is intended to reduce inter-cell interference under the multi-cell environment, based on the reported information.

The aforementioned embodiments are achieved by combination of structural elements and features of the present invention in a predefined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment according to the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

According to the present invention, the mobile station that uses fractional frequency reuse under the multi-cell environment can use fractional frequency reuse more efficiently.

What is claimed is:

1. A method for transmitting a signal from a mobile station in a multi-cell environment, the method comprising:
   receiving information indicating a specific frequency partition allocated to the mobile station according to a fractional frequency reuse scheme;
   receiving modulation and coding scheme (MCS) level information related to the specific frequency partition or a specific resource region within the specific frequency partition;
   controlling transmit power corresponding to an MCS level according to a location of the mobile station within a cell if the specific frequency partition is a frequency partition shared with a mobile station located at an edge region of a neighboring cell; and
   transmitting a signal at the controlled transmit power,
   wherein the signal is transmitted using transmit power corresponding to a predefined reference value if the controlled transmit power is less than the predefined reference value, and
   wherein the frequency partition shared with the mobile station located at the edge of the neighboring cell includes at least a frequency partition having a frequency reuse rate of 1 or a frequency partition having a frequency reuse rate that is the reciprocal of an integer and used by one or more mobile stations located at the edge of the neighboring cell.

2. The method of claim 1, wherein the transmit power is controlled to be higher than the transmit power corresponding to the MCS level if the mobile station is located at the edge of the cell and the MCS level is greater than a first reference value.

3. The method of claim 2, wherein, the transmit power is controlled to be a full transmit power available in the mobile station if the mobile station is located at the edge of the cell and the MCS level is less than the first reference value.

4. The method of claim 2, wherein the transmit power is further controlled according to interference and path loss if the mobile station is located at the edge of the cell and the MCS level is less than the first reference value.

5. The method of claim 1, wherein the transmit power is controlled to be higher than the transmit power corresponding to the MCS level if the mobile station is located at a center of the cell and has a geometry information value greater than a first reference value.

6. The method of claim 5, wherein the transmit power is controlled to be lower than the transmit power corresponding to the MCS level if the mobile station is located at the center of the cell and has a geometry information value less than the first reference value.

7. A mobile station operating in a multi-cell environment, the mobile station comprising:
   a receiving module for receiving information indicating a specific frequency partition allocated to the mobile station according to a fractional frequency reuse scheme and modulation and coding scheme (MCS) level information related to the specific frequency partition;
   a processor for controlling transmit power corresponding to an MCS level according to a location of the mobile station within a cell if the specific frequency partition is a frequency partition shared with a mobile station located at an edge region of a neighboring cell; and
   a transmitting module for transmitting a signal at the controlled transmit power,
   wherein the processor controls the transmitting module to transmit the signal using transmit power corresponding to a predefined reference value if the controlled transmit power is less than the predefined reference value, and wherein the frequency partition shared with the mobile station located at the edge of the neighboring cell includes at least a frequency partition having a frequency reuse rate of 1 or a frequency partition having a frequency reuse rate that is the reciprocal of an integer and used by one or more mobile stations located at the edge of the neighboring cell.

8. The mobile station of claim 7, further comprising:
a memory for storing at least modulation and coding scheme information corresponding to each MCS level information, information related to a first reference value for the MCS level, and information related to a second reference value for geometry information.

9. The mobile station of claim 8, wherein:
the processor controls the transmit power to be higher than the transmit power corresponding to the MCS level if the mobile station is located at the edge of the cell and the MCS level is greater than the first reference value stored in the memory; and
the processor controls the transmit power to be a full transmit power available in the mobile station if the mobile station is located at the edge of the cell and the MCS level is less than the first reference value stored in the memory.

10. The mobile station of claim 8, wherein
the processor further controls the transmit power according to interference and path loss if the mobile station is located at the edge of the cell and the MCS level is less than the first reference value stored in the memory.

11. The mobile station of claim 8, wherein:
the processor controls the transmit power to be higher than the transmit power corresponding to the MCS level if the mobile station is located at the center of the cell and has a geometry information value greater than the second reference value stored in the memory; and the processor controls the transmit power to be lower than the transmit power corresponding to the MCS level if the mobile station is located at the center of the cell and has a geometry information value less than the second reference value stored in the memory.

* * * * *